July 19, 1966   C. A. ALFSEN   3,261,618
LOAD LIFTING WHEEL ASSEMBLY
Filed March 30, 1964   3 Sheets-Sheet 1
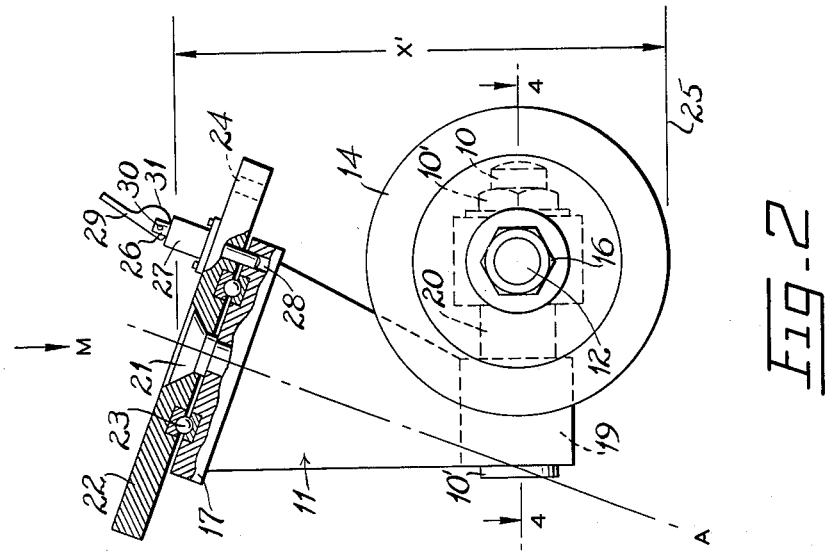
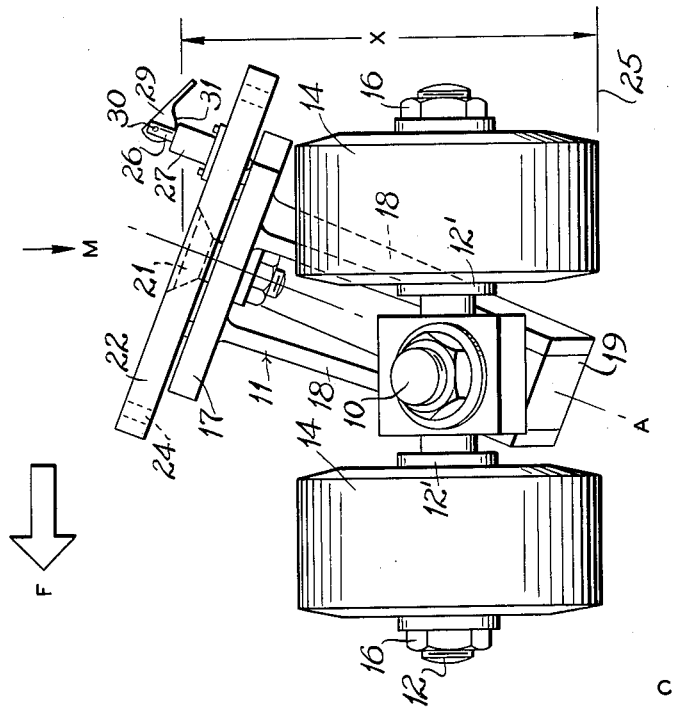
INVENTOR.
CHRISTIAN A. ALFSEN
BY
*John J. Sullivan*
ATTORNEY July 19, 1966   C. A. ALFSEN   3,261,618
LOAD LIFTING WHEEL ASSEMBLY
Filed March 30, 1964   3 Sheets-Sheet 2
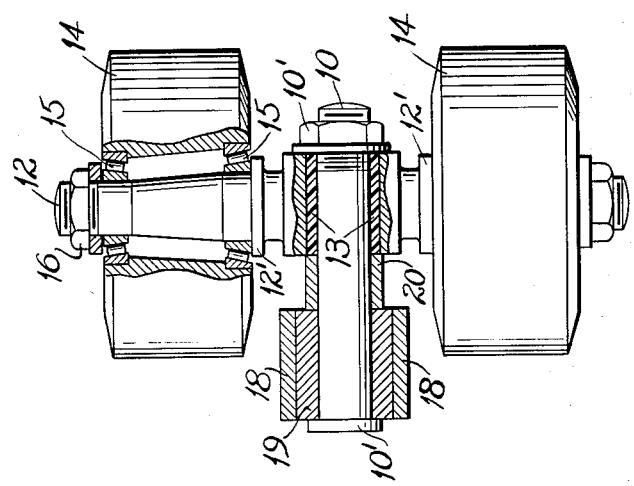
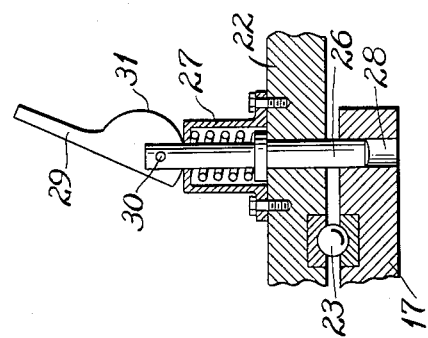
INVENTOR.
CHRISTIAN A. ALFSEN
BY *John J. Sullivan*
ATTORNEY July 19, 1966  C. A. ALFSEN  3,261,618
LOAD LIFTING WHEEL ASSEMBLY
Filed March 30, 1964  3 Sheets-Sheet 3
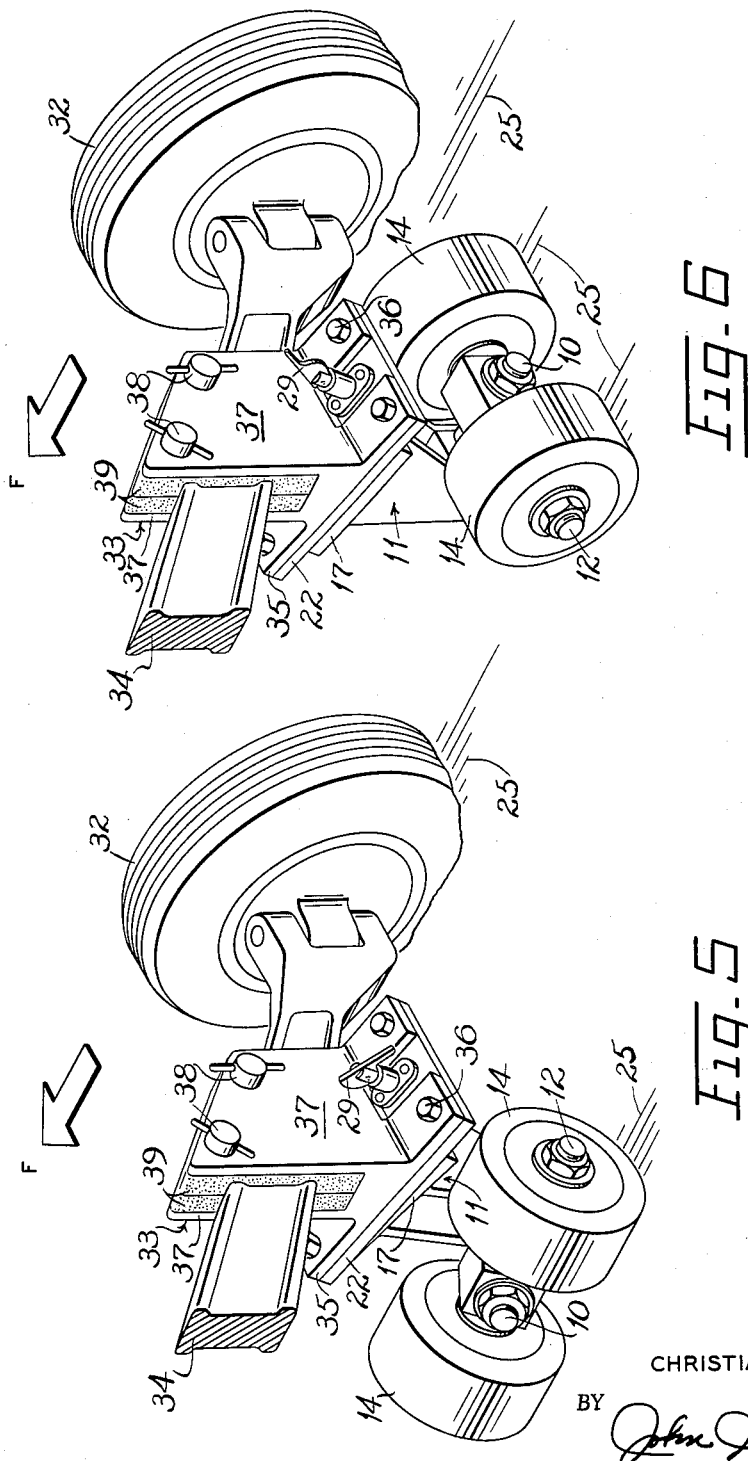
INVENTOR.
CHRISTIAN A. ALFSEN
BY
ATTORNEY 3,261,618
LOAD LIFTING WHEEL ASSEMBLY
Christian A. Alfsen, East Northport, N.Y., assignor, by mesne assignments, to Fairchild Hiller Corporation, Hagerstown, Md., a corporation of Maryland
Filed Mar. 30, 1964, Ser. No. 355,686
8 Claims. (Cl. 280—47)

This invention relates to wheel assemblies facilitating the movement of loads over surfaces and more particularly to such a wheel assembly adapted to be removably connected to a load in such a way that a moving force applied to the load causes the wheel assembly to sequentially lift the load from the surface on which it rests transferring its weight onto the wheel assembly and then roll the load so supported over the surface.

Heretofore, where it has been desired to lift a load at rest on a surface to facilitate its movement over the surface, various schemes have been proposed. The more advanced of these prior schemes attempt to combine lifting mechanisms with wheel or roller means so that the lifting and rolling operations are sequentially effected by a unitary apparatus or wheel assembly. To this end these prior wheels have included relatively complex mechanisms such as eccentrics, cam surfaces, ramps, slotted plates and the like to effect the initial lifting and various locking devices to secure the wheels in the lifted position during subsequent movement or rolling.

The present invention contemplates an improved wheel assembly substantially simpler in construction and operation and more reliable than those heretofore known. This wheel assembly includes means whereby it may be temporarily secured to a load while resting on a surface in such a manner that a force normally applied to move such a load will automatically raise the load from the surface transferring its weight onto the wheel assembly. Continued application of such force will move the load over the surface on the wheel assembly. When the direction of the applied force is reversed the wheel assembly automatically operates to lower the load transferring its weight from the wheel assembly directly onto the supporting surface.

The wheel assembly herein proposed comprises in essence at least one surface-contacting roller or wheel mounted for unrestricted rotation on an axle adjacent each of the opposed ends thereof. The axle in turn is pivotally connected medially of its length to a support that is rotatably connected to a load to project therefrom at a selected angle relative to the surface on which the load is suported. The respective axes of rotation of the support and wheels are disposed laterally of each other to the end that the axle and wheels swing as a unit in a plane perpendicular to the selected angle of the support upon the rotation thereof. This corresponds to an inclined plane relative to the supporting surface. Since the mass or weight of the load maintains the wheels in contact with the supporting surface, the above-described rotation effects a lifting of the load through 180° and a lowering of the load through the remaining 180° of each resolution.

By initially positioning the wheel assembly with its wheels substantially normal to the direction of force to be applied, application of such force will cause the rotation of the support or spindle swinging the wheels to a position parallel to the direction of the applied force. The load is thereby lifted from its supporting surface and its weight shifted onto the wheel assembly. So long as this direction of the applied force is substantially the same the wheels are effectively locked in the parallel position to facilitate movement of the load over the surface.

When the load is thus conveyed to a desired location the direction of force applied may be reversed causing the spindle to rotate, swinging the wheels from the parallel position to their original, normal position. The load is concurrently lowered thereby and its weight shifted from the wheels back onto the supporting surface.

Additionally, releasable locking means is provided between the load and the spindle to secure and maintain the wheels in the parallel position aforesaid. This corresponds to the load-bearing and rollable position of the wheel assembly whereby the direction of force applied in conveying the load may be varied without effecting the automatic lowering of the load to the surface, as might otherwise result. In this case the locking means is released when the load reaches its destination to permit the lowering thereof, as previously stated.

Moreover, adjustable means is provided between the support and axle of the present wheel assembly whereby the lateral displacement of the respective axes of rotation of the support and wheels may be varied to produce a selected range of lift. Such means is operable to permit adjustment of such displacement subsequent to the lifting operation to the end that the moment produced on this connection may be decreased during the rolling operation without affecting the load-bearing function of the wheel assembly. Thus, greater loads can thereby be accommodated by the wheel assembly.

With the above and other objects in view, as will be apparent, this invention consists in the construction, combination and arrangement of parts, all as hereinafter more fully described, claimed and illustrated in the accompanying drawings wherein:

FIG. 1 is a side elevation of a wheel assembly constructed in accordance with the teachings hereof and disposed in the initial position relative to the direction of a load-lifting and -moving force (indicated by the arrow F) to be applied as it would be connected to a load at rest on a supporting surface;

FIG. 2 is a similar view (partly in section) after the application of said force whereby the load has been raised from the supporting surface and its weight transferred directly onto the wheel assembly;

FIG. 3 is a longitudinal section through the releasable locking device operative between the load and the spindle of the wheel assembly to show the means by which it may be rendered automatically operative or released and rendered inoperative, only a fragment of the associated components of the wheel assembly being shown;

FIG. 4 is a section taken along the line 4—4 of FIG. 2;

FIG. 5 is a perspective view of the same wheel assembly as applied to a specific load, i.e., a vehicle, only a fragment of which is shown in the area adjacent one of its wheels that is defective due to a flat tire, to illustrate the manner in which the present wheel assembly may be connected through an adapter to secure it to the vehicle in the initial position corresponding to that of FIG. 1; and FIG. 6 is a similar view after application of the load-lifting and -moving force in the direction of the arrow whereby the wheel assembly is disposed in the load-bearing position corresponding to that of FIG. 2.

Referring more particularly to the drawings 10 designates a projection or stud carried by and projecting laterally from a support or spindle 11. An axle 12 is rotatably mounted medially of its length through bearing means 13 on the outer end of the stud 10 to be thereby disposed at right angles to the stud 10. Roller means, in the form of a pair of spaced wheels 14, is rotatably mounted on the axle 12, each wheel 14 being independently mounted on a suitable bearing 15 and disposed adjacent an opposite end of the axle 12. Centrally the axle 12 is formed or otherwise provided with enlarged portions or collars 12', the outer faces of which are adapted to abut the associated sides of the respective wheels 14 and act in opposition to a retaining nut 16 mounted on each outer end of the axle 12 whereby the wheels 14 are secured thereon against lateral movement.

The spindle 11 is formed by an end plate 17 and a pair of spaced arms 18 projecting perpendicularly from one face thereof. The stud 10 is secured to the outer end of said arms 18, being mounted in and extending from a block 19 immovably held between the arms as for example by welding. To facilitate manufacture and assembly the stud 10 is made in the form of a bolt the shank of which is adapted to pass through and be shrink-fitted in a bore provided in the block 19 and having an enlarged head 10′ disposed in abutment with a surface of the block 19 to act in opposition to a retaining nut 10″ threadably mounted on the opposed end of the shank in abutment with the axle 12. A spacer 20 may be disposed on the shank of the bolt-stud 10 between the axle 12 and block 19 to prevent relative lateral movement.

At its other end the spindle 11 is rotatably secured as at 21 to a mounting plate 22 parallelly disposed relative to the end plate 17. Antifriction means in the form of roller bearings 23 are provided between the adjacent surfaces of the plates 17 and 22, being mounted in customary manner, to facilitate the unrestricted relative rotation thereof. The mounting plate 22 is formed or otherwise provided with appropriate connection means, such as apertures 24, by and through which it is adapted to be immovably and releasably secured to a load or mass, indicated by M, resting on a surface 25.

With the load M resting on the supporting surface 25 the mounting plate 22 is bolted or otherwise connected to it (through appropriate adapter means if necessary) with the axis of rotation A of the spindle 11 disposed at a selected angle relative to the direction of the load imposed by the mass M. At the same time the wheels 14 contact the surface 25 and are disposed normal (FIG. 1) to the direction of the force to be applied, as indicated by the arrow F, to move the mass M over the surface 25. The initial application of force F causes the rotation of the spindle 11 and movement of the wheels 14 in a plane perpendicular to axis A, i.e., in an angular or inclined plane relative to the surface 25. This results in a lifting of the load M from the surface and onto the wheels 14 until the wheels have rotated approximately 90° and are disposed parallel to the direction of force F (FIG. 2). The difference in length of the lines $x$ and $x'$ corresponds to the amount of this lifting as determined by the selected angle of the axis of rotation of the spindle 11 with respect to the surface 25 and the lateral displacement of the axis of rotation of the wheels 14 from the axis A.

Continued application of the force F in the direction of the arrow causes the load M to be rolled over the surface 25 on the wheel assembly whereby it is readily transported to the desired location. When it reaches the new location, the load M may be lowered to the supporting surface 25 simply by reversal of direction of the force F.

It is noted that the construction of the stud 10 in the form of a bolt/nut permits the adjustment of its length whereby the lateral displacement of the axis of rotation of the wheels 14 from the axis A may be varied correspondingly to a range of lifting distances. It is also noted that the stud 10 is disposed at an acute angle relative to the spindle 11 as established by its axis of rotation A. Thus, in the rolling position (FIG. 2) the stud 10 is substantially parallel to the surface 25. This is not critical, however, it is preferred since it facilitates steering and permits adjustment of the lateral displacement of the axis of rotation of the wheels 14 from axis A subsequent to the lifting operation so as to decrease the moment imposed upon the spindle 11 in the area of the block 19 during transportation without affecting the level of the load.

Additionally, a locking device is included as an integral part of the wheel assembly and employable in instances where it is desired to releasably secure the wheel assembly in the load-supporting and rolling position of FIG. 2. To this end a spring-loaded pin 26 is mounted on the upper surface of the mounting plate 22 through a housing bracket 27 and projects through a hole piercing the plate 22. A complemental opening 28 is provided in the plate 17 in alignment with the pin 26 when the wheels 14 are disposed in the load-supporting and -rolling position (FIG. 2) whereby the pin 26 is permitted to extend under the normal action of its spring and secure the spindle 11 against movement relative to the mounting plate 22.

Means is further provided to render the above-described locking device inoperative. For this purpose the upper end of the pin 26 extends beyond the bracket 27 passing through an opening provided therefor. A lever 29 is pivotally connected, as at 30, to the extending end of the pin 26 and terminates at this end in a cam surface 31 adapted to abut the adjacent surface of the bracket 27. When rotated the lever 29 thereby withdraws the pin 26 from its housing bracket 27 against the normal action of its spring and in the ultimate position retains the pin 26 out of contact with the spindle plate 17.

While a single wheel assembly has been hereinabove described in terms of structure and operation, it is manifest that in many applications multiple such units will be employed. For example, where the load M is a structure, such as an article of furniture or the like that is not otherwise readily rollable, two or more of the present wheel assemblies suitably spaced for proper balancing will be used, each constructed and mounted to function as described.

In other applications, however, where the load M is otherwise readily rollable, for example, a vehicle mounted on multiple wheels only one of which is defective, a single wheel assembly may be employed as a temporary measure pending repair to the defective wheel. FIGS. 5 and 6 are specifically directed to such an application illustrating one wheel 32 of a multiwheel vehicle which has been rendered defective due to a flat tire.

With the tire and that portion of the weight of the vehicle supported by the defective wheel 32 resting on the surface 25, the present wheel assembly is brought into position with the wheels 14 disposed normal to the direction of moving force F to be applied and in contact with the surface 25. The wheel asembly is then fixedly secured to the vehicle as for example through an adapter 33 that clampingly engages an axle or strut 34 by which the wheel 32 is mounted to the vehicle.

The adapter 33 is formed by a plate 35 having a flat surface for abutting contact with the upper surface of the mounting plate 22 to which it is immovably secured by bolts 36 operative through the apertures 24. Projecting laterally from the opposite surface of the plate 35 is a pair of spaced arms 37 between which the strut 34 is adapted to be received and clampingly secured by locking bolts 38. A protective liner in the form of pads 39 fabricated of nonabrasive material may be employed between the arms 37 and strut 34 to facilitate this connection and prevent damage to the strut.

The angle of the projecting arms 37 with respect to the plate 35 is such that the plate 35 is disposed in a selected angular position relative to the ground 25 when the arms 37 are vertical, i.e., disposed under the strut 34 so as to oppose the direction of force imposed by the weight of the vehicle. This angular position of the plate 35 establishes the angle of the axis of rotation A of the spindle 11 with reference to the ground 25 and the plane in which the wheels 14 swing when the spindle 11 rotates.

By an application of force F in the direction of the arrow, the spindle 11 is caused to rotate swinging the wheels 14 approximately 90° to a position parallel to the direction of force F. The defective wheel 32 of the vehicle is thereby raised from the surface 25 and the weight of the vehicle normally borne thereby is simultaneously transferred to the wheel assembly. In this condition the rollability of the vehicle is restored virtually as it was prior to failure of the wheel 32, the locking device being operative, if desired, to secure the wheel assembly in the load-bearing and rolling position (FIG. 6) as previously described. Subsequently, when the damaged tire has been repaired or replaced, the wheel assembly and the adapter 33 are readily removable through disconnection of the bolts 36 and 38 respectively.

What is claimed is:

1. A wheel assembly to facilitate the movement of a load over a surface comprising a rotatable support, means for mounting said rotatable support on said load at a selected angle relative to said surface, said support having an outwardly extending arm, a stud projecting laterally from the outer end of said support, an axle pivotally connected medially of its length to the outer end of said stud, and at least one wheel mounted for unrestricted rotation on said axle adjacent each end thereof whereby the application of a moving force to said load with said support inclined in the direction of the moving force and said wheels disposed in contact with said surface and normal to the direction of said moving force causes the rotation of said support relative to said load moving said wheels to a position parallel to the moving force direction.

2. The assembly of claim 1 wherein said stud is adjustable in length whereby the location of said axle relative to said support may be varied.

3. The assembly of claim 1 wherein the angle of projection of said stud from said support is such that the stud is disposed substantially parallel to said surface when said wheels are disposed in the parallel position aforesaid.

4. The assembly of claim 1 including a locking device operative between said support and said load to prevent relative rotation therebetween when said wheels are disposed in the parallel position aforesaid.

5. The assembly of claim 4 wherein said locking device includes means rendering it inoperable.

6. The assembly of claim 1 wherein said rotatable support comprises a plate, releasable connection means operative between said plate and said load and a spindle rotatably connected to and extending substantially perpendicular from said plate.

7. The assembly of claim 6 wherein said releasable connection means includes an adapter connectable to said plate having a pair of spaced arms projecting therefrom in opposition to said spindle to engage and secure the load.

8. A wheel assembly to facilitate the movement of a load over a surface comprising a rotatable support, means for mounting said rotatable support on said load at a selected angle relative to said surface, said support having an outwardly extending arm, a stud projecting laterally from the outer end of said arm, an axle pivotally connected medially of its length to the outer end of said stud, at least one wheel mounted for unrestricted rotation on said axle adjacent each end and means on said load in contact with the supporting surface when said wheel assembly is in a disengaged position whereby the application of a moving force to said load with said support inclined in the direction of the moving force and said wheels disposed in contact with said surface and normal to the direction of said moving force causes the rotation of said support relative to said load moving said wheels to a position parallel to the moving force direction.

References Cited by the Examiner
UNITED STATES PATENTS

| | | |
|---|---|---|
| 1,630,421 | 5/1927 | George. |
| 2,544,924 | 3/1951 | Herold. |
| 3,062,559 | 11/1962 | Hewitt _____ 16—21 X |

BENJAMIN HERSH, *Primary Examiner.*

J. A. PEKAR, *Assistant Examiner.*